A. D. HADSEL.
HOISTING DRUM.
APPLICATION FILED MAY 2, 1910. RENEWED JULY 12, 1911.
1,015,487. Patented Jan. 23, 1912.
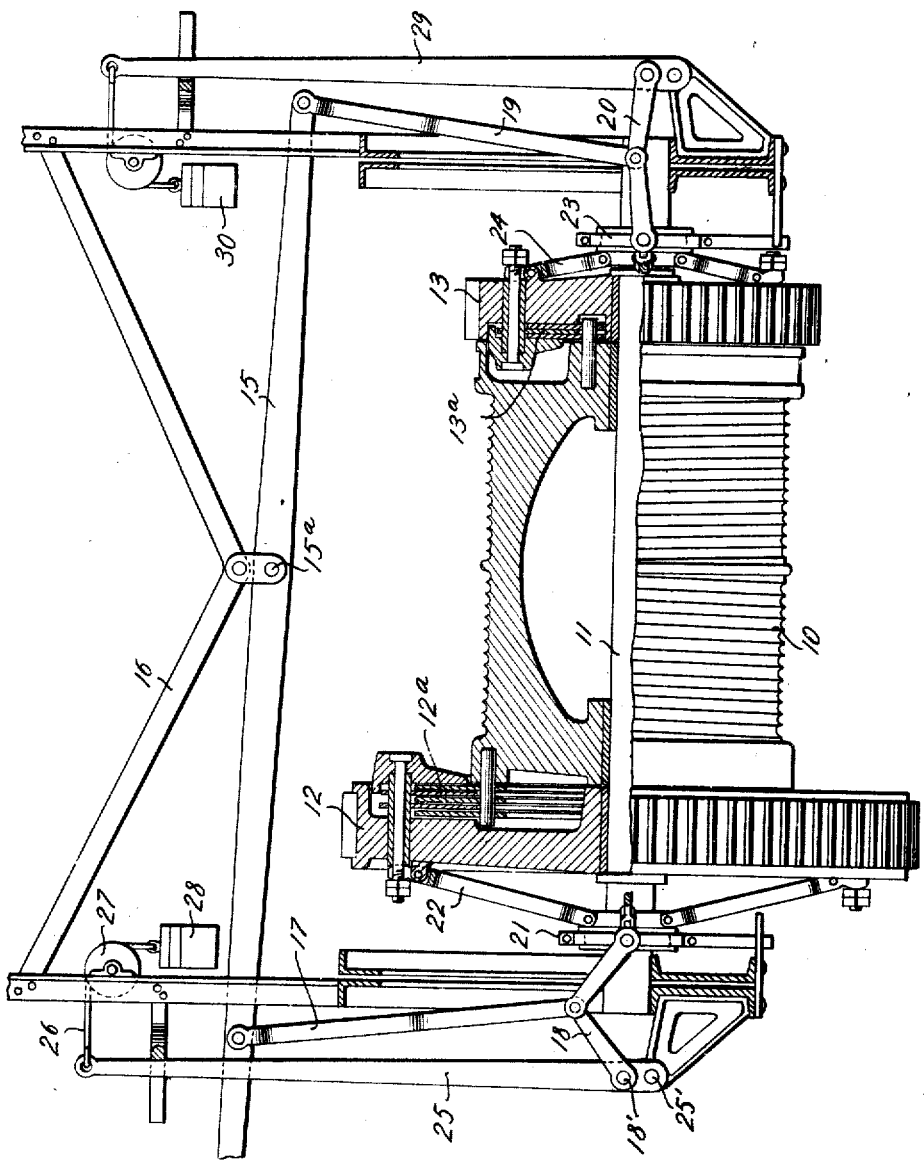

UNITED STATES PATENT OFFICE.

ALVAH D. HADSEL, OF DORRANCETON, PENNSYLVANIA, ASSIGNOR TO CABLE EXCAVATOR COMPANY, OF PHILADELPHIA, PENNSYLVANIA, A COPARTNERSHIP.

HOISTING-DRUM.

1,015,487.  Specification of Letters Patent.  Patented Jan. 23, 1912.

Application filed May 2, 1910, Serial No. 558,776.  Renewed July 12, 1911.  Serial No. 638,210.

*To all whom it may concern:*

Be it known that I, ALVAH D. HADSEL, a citizen of the United States, residing at Dorranceton, in the county of Luzerne and State of Pennsylvania, have invented certain new and useful Improvements in Hoisting-Drums, of which the following is a specification.

This invention relates to hoisting machinery, and has particular reference to improvements in hoisting drums and controlling devices therefor which possess peculiar novel features of utility and advantage hereinafter fully described and claimed, and illustrated in the accompanying drawing which is a side elevation, partly in section, of a hoisting drum and the parts associated therewith.

The drum 10 may be of any suitable character with respect to its surface, but as shown is grooved for the accommodation of two hoisting or draft ropes. The drum is journaled for rotation upon a supporting shaft 11 between a pair of driving gears 12 and 13. The gears just mentioned are adapted to be driven from a single motor, not shown, in alternation, the one gear 12 being intended to be driven at slow speed for greater power, and the gear 13 to be driven at correspondingly faster speed and less power. It is well known in this art that at certain times the maximum strength or power of the hoisting apparatus is necessary and at other times when there is an excess of available power it is essential that time be saved by operating the drum more rapidly. Each of said gears is adapted to be clutched to the adjacent end of the drum. A clutch 12$^a$ is interposed between the gear 12 and the drum, and a corresponding clutch 13$^a$ between the gear 13 and the drum. These clutches are of well known construction and operation and do not require specific description except to note that each clutch is adapted to be set in operation to grip the corresponding gear to the drum by virtue of a set of toggle links pivoted to the outer face of the gear and operating upon a set of bolts passing through the gear and connected to a collar on the inner face of the gear.

At 15 is shown an operating lever pivoted at a fixed point 15$^a$ to a suitable bracket 16 of the frame-work. Said lever 15 may be provided with any suitable form of operator's handle whereby the operator of the machine will have control of both clutches. To this end a link 17 is connected at one end of the lever and operates a pair of toggle links 18. At the other end of the lever 15 is a link 19 adapted to operate a pair of toggle links 20. Upon moving the lever 15 on its pivot both pairs of toggles 18 and 20 will be operated, one pair in the direction to set the clutch associated therewith and the other pair in a direction to release the clutch associated with them. The links 18 operate a collar 21 to which the clutch toggles 22 are connected, and when the said collar is moved toward the drum sufficiently far the clutch 12$^a$ will be set. The toggle links 20 are likewise connected to a collar 23 to which the toggles 24 of clutch 13$^a$ are connected.

From the construction shown and described it will appear that the clutches may be set with very great power and in view of the fact that the operators of such machinery are frequently men of great strength and comparatively little intelligence it is found necessary and advisable to provide a means whereby it is rendered practically impossible for either of the clutches to be set too vigorously, whereby the machinery may be subjected to excessive and unnecessary strains. Also, it is important that a clutch for this type of machinery shall be so designed that it will be impossible for an overload to be placed upon the digging or conveying devices. In this connection therefore it is to be noted that each pair of toggle links operate directly from the controller lever 15 and are provided with a movable abutment. The links 18 have for their abutment a lever 25 pivoted at 25′ to the fixed frame, the point of connection 18′ of the adjacent toggle link being closely adjacent said pivot 25′. The free end of the abutment lever 25 has connected to it a flexible connection 26 passing over a guide pulley 27 and to which at its other end is connected a weight 28 of any suitable or variable heft. Likewise the toggles 20 are provided with a movable abutment lever 29 to which is connected the variable weight 30. It is apparent therefore that when too much force is applied to either pair of toggles 18 or 20 the abutment therefor will move outwardly away from the clutch, lifting its weight. If too much resistance should be brought to bear either upon the clutch directly or upon the load being operated upon, the movable abutment for the clutch mechanism will prevent damage to the clutch. In the first case the movable abutment would prevent the operator from setting the clutch too tightly, and in the latter case the overload would cause the clutch to slip. It is to be understood of course that the weights 28 and 30 will be so timed or designed as to permit the clutches to slip in accordance with the various operations to be performed. Again, this structure or feature of the movable abutment for the clutch will always insure prompt action of the clutch regardless of ordinary wear upon the clutch disks.

Having thus described the invention what I claim as new is:—

1. In a hoisting machine, the combination of a hoisting drum, a pair of driving gears of different sizes associated therewith, a friction clutch between each of said gears and the drum, controlling devices associated with the clutches whereby the frictional effect of the clutches will be simultaneously controlled in opposite directions, and means whereby the force of either clutch will be determined in accordance with the maximum load thereon.

2. In a hoisting machine, the combination of a hoisting drum, a shaft supporting said drum, a pair of gears mounted upon the shaft at the opposite ends of the drum, a clutch between each gear and the drum, collars mounted slidably upon the shaft adjacent the respective gears, pairs of toggle links connected to the collars, and a lever connected to said pairs of toggle links for simultaneous operation thereof in opposite directions.

3. In a hoisting machine, the combination of a drum, a driving gear therefor, a clutch between said gear and the drum, and means for operating said clutch, said means including a movable abutment and a pair of toggle links one of which is connected to said abutment and the other of which is connected to said clutch.

4. In a hoisting machine, the combination of a drum, a gear, a clutch between the gear and drum, an abutment movable automatically under variable loads, and controlling devices for said clutch operative between said movable abutment and the other features of the clutch.

In testimony whereof I affix my signature in presence of two witnesses.

ALVAH D. HADSEL.

Witnesses:
HARRY M. KURTZ,
A. L. MOORE.